United States Patent [19]

Chauvat et al.

[11] 4,288,783
[45] Sep. 8, 1981

[54] DEVICE FOR SELECTIVELY AUTHORIZING PASSAGE THROUGH A DOOR

[75] Inventors: Dominique Chauvat, Chalet des Mounines, Bressolles, 03000 Moulins; Michel Charpentier, 42 avenue des Jardins Anglais, 77410 Claye-Souilly, both of France

[73] Assignees: Dominique Chauvat, Moulins; Michel Charpentier, Claye-Souilly; S.A. Emile Chauvat et Sofranq Reunis, Moulins, all of France; a part interest to each

[21] Appl. No.: 152,465

[22] Filed: May 23, 1980

[30] Foreign Application Priority Data

May 23, 1979 [FR] France ................................ 79 13078

[51] Int. Cl.³ .......................... H04Q 3/00; G06K 5/00
[52] U.S. Cl. ................................. 340/149 A; 235/382
[58] Field of Search ........................... 340/149 A, 543; 235/382

[56] References Cited

U.S. PATENT DOCUMENTS 4,035,614  7/1977  Frattarola ..................... 340/149 A

*Primary Examiner*—Harold I. Pitts
*Attorney, Agent, or Firm*—Sughrue, Mion, Zinn, Macpeak and Seas

[57] ABSTRACT

The invention comprises an improved device for selectively authorizing passage through a door. A card reader accessible from each side of the door comprises a path along which the card is moved, terminating at its opposite ends in respective slots with respective card sensors, and a drive system for moving a card in either direction along the path. The device is microprocessor-controlled and is responsive to insertion of a card in a first slot by moving the card to a position beyond a read head. If the signal on the card authorizes access the door is opened and the card is moved to the second slot. If not, the card is returned to the first slot.

10 Claims, 6 Drawing Figures

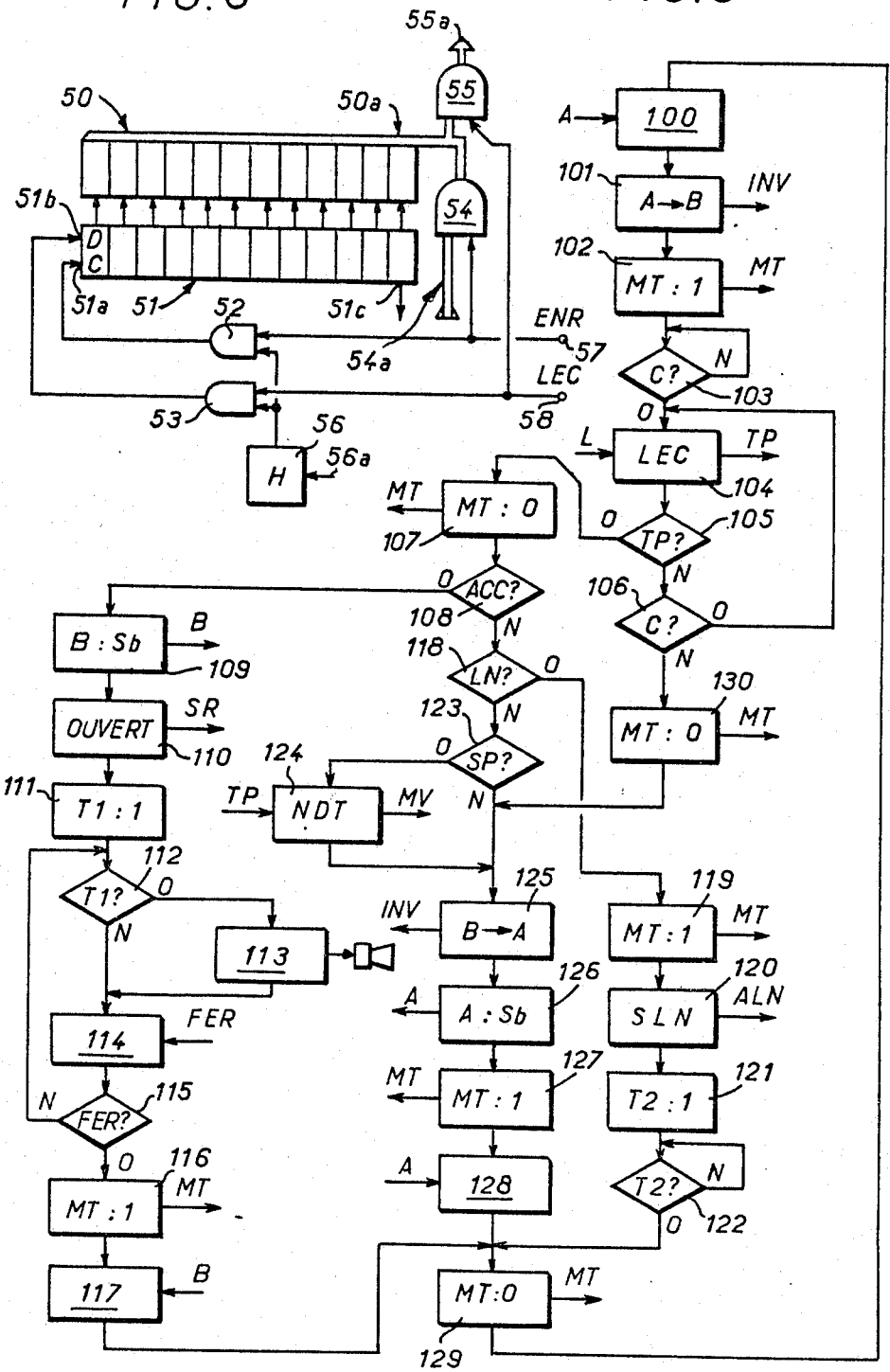

ns through a door. Prior patents include French Pat. No. 2,107,529 and French Pat. No. 2,325,992.

DEVICE FOR SELECTIVELY AUTHORIZING PASSAGE THROUGH A DOOR

BACKGROUND OF THE INVENTION

1. Field of the Invention

The invention relates to a device for selectively authorising the bearer of a coded card to pass through a door in a wall.

2. Description of the Prior Art

In establishments where, for reasons of security, access to the establishment or to certain areas thereof is restricted to certain authorised persons, it is current practice to provide such persons with keys opening only the locks of those doors providing access to the areas of the establishment to which access is authorised. The number of possible combinations is relatively small, in that each lock can only accept a small number of differently patterned keys. In other words, it is the locks which define the operating key categories, so that the various areas of the establishment are of fixed configuration, unless these locks are changed. Moreover, keys may be stolen or copied, in which case continuing security calls for the replacement of all locks opened by the key which might be used to secure unauthorised entry.

It has already been proposed to substitute for these keys cards carrying a recorded digital signal, in particular a signal recorded magnetically. French Pat. No. 2 107 529 describes a device using a magnetic card and designed especially for use in hotels. A card reader adjacent the door to which the magnetic card is allocated is connected to a remotely sited central system. The signal read from the magnetic card and a card reader identifying signal are sent to the central system. Using data stored in its memory, the central system operating program decides if the card corresponds to the door in question and if the card is currently valid. If this is the case, the central system sends a command signal to means for opening or permitting opening the door, such as an electrically operated striking box. The number of possible combinations is very substantially increased, not only in that the encoded signal on the card may embody a much larger number of items of information than the pattern of a key, but also because it is the signal on the card and not the lock which is the determining factor in authorising access. While a key is associated with one or more locks, the card is associated with its bearer. The use of a remotely sited central system means, however, that the card reader must be similar to and connected to the central system in the same way as a computer peripheral. The reliability of the system is dependent on the quality of the link to the central unit.

French patent application No. 2 325 992 describes a stand-alone device operated by magnetic cards and programmed to authorise or prohibit access to one or more cards. A memory records a first list of authorising signals and a second list of prohibiting signals. The door is openable if the signal on the card inserted in the reader appears in the list of authorising signals and does not appear in the list of prohibiting signals. This arrangement is simpler than that using a central control system, and its operation is not dependent on the quality of links to a central unit or on the level of availability of the central unit. The arrangement is a relatively rigid one, however, in that when authorisation is withdrawn from a card bearer by writing the corresponding details into the prohibiting signal list it is no longer possible to revalidate the authorisation. This means that there is no facility for modifying authorisations at a later date.

Also, writing data into the prohibiting signal list involves connecting a manual programming unit to the card reader.

Prior art devices, whether operating on a stand-alone basis or in conjunction with a central unit, are designed to selectively authorise passage through a door in one direction, movement through the door in the opposite direction being unrestricted. Selective authorisation of access in both directions would require the use of a card reader on each side of the wall containing the door. Furthermore, there is no provision for checking that opening of the door is followed by its closure, so that should an authorised person happen to forget to close the door, access would be unrestricted. Finally, should an authorised person forget to retrieve his card from the reader, any other person is free to make use of the card of open the door.

The present invention is intended to provide a stand-alone device for selectively authorising passage through a door in both directions and returning the card to the user only when the door has been closed again.

SUMMARY OF THE INVENTION

The present invention consists in a device for selectively authorising the bearer of a coded card to pass through a door in a wall, the device comprising: a card reader located in the vicinity of the door and accessible from the or each approach side thereof, said card reader being responsive to the insertion of a card by reading a digital signal recorded on the card and comprising a path along which the card is moved, extending longitudinally between opposite sides of the aforementioned wall and terminating at its opposite ends in respective slots with respective card sensors, a bidirectional drive system for moving a card in either of two opposite directions along said path and a read head centrally located on said card path to read the aforementioned signal from a longitudinal track centrally located on the card; means for opening or permitting opening of the door in response to an electrical command signal; a logic unit including a memory and connected to said card reader and said door opening means to compare the read digital signal with a plurality of digital signals stored in said memory and responsive to equality of said read signal with at least one of said stored signals by sending an electrical command signal to said door opening means, said logic unit being responsive to insertion of a card in the first of said slots by causing said drive system to operate in such a way as to move the card in a first direction from said first slot to a position beyond said read head and selectively responsive to comparison of the signal read from the card with the aforementioned plurality of signals by causing said drive system to operate in such a way as to move the card in a second direction opposite to said first direction so as to return it to the first slot, or by sending an electrical command signal to said door opening means; and means responsive to closure of the door following the sending of said electrical command signal to said door opening means by causing said drive system to operate in such a way as to move the card to the second slot.

Insertion of the card in the slot on the approach side of the door results in the card entering the path and the coded stripe on the card being read. If the digital signal recorded in the stripe is not an authorising signal, the code is returned to the user without the door being opened. This advises the card bearer that he may have misoperated the system or that he is not authorised to pass through the door in question. On the other hand, if the signal recorded on the stripe is an authorising signal, the door opens. The card bearer must pass through the door and close it behind him to recover the card, which is only accessible at the second slot after the door is closed again.

The system may be arranged so that, if the signal on the card appears on a "blacklist" (if the card has been stolen or lost, for example), the drive system operates to move the card in the first direction to the second slot, obviously without opening the door. The misappropriated card is thus removed from circulation.

The read head may be offset to one side of a special longitudinal axis of the card path and two parallel coded tracks recorded on the stripe on the card. The access authorising conditions may then differ, according to the direction from which the door is approached. Generally speaking, the conditions authorising access from an area may be considerably less strict than the conditions governing access. On the other hand, security may be enhanced by authorising exit only if preceded by an entry using the same card.

Opening of the door is preferably accompanied by the initiation of a time-delay such that an alarm is triggered if the door is not closed before the end of the time-delay. This reduces the risk of access being obtained by a number of persons using the same card.

An alarm trigger system may with advantage be disabled by said means responsive to closure of the door and by said time-delay system between the start and end of said time-delay. Improper opening of the door is then signalled in the same way as the door being opened for an excessive period of time.

The logic unit preferably comprises a random access memory for recording signals read by the read head, so that the access authorising conditions may be modified by means of card read operations.

The random access memory may also be used to store time and date signals obtained from a clock system, whereby the selective authorisation to pass through the door may be conditioned by the time of day, the day of the week or the date.

This memory may also be used to record signals received from a central control unit, to cater for special requirements.

The logic unit preferably has a monitor output whereby signals are output to a central unit for listing purposes. This would provide for centralised monitoring of device operation, without compromising the stand-alone capability of each individual device.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 5 is a block schematic of a buffer memory associated with a read head.

FIG. 6 is a flowchart showing the operating sequence of a device in accordance with the invention.

DESCRIPTION OF THE PREFERRED EMBODIMENT

Figure 1:
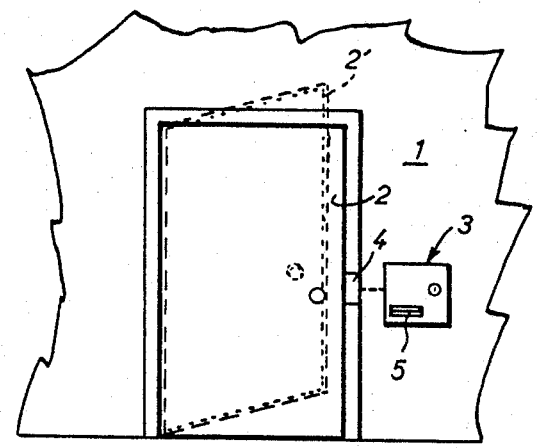
FIG. 1 is a general view of a device in accordance with the invention, mounted in a wall to control access through a door in the wall.
Figure 2:
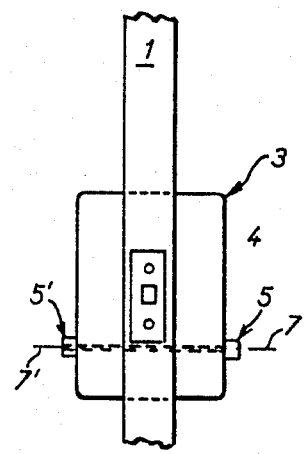
FIG. 2 shows the device as seen from in the doorway.

Referring to FIG. 1, a wall 1 defining an area to which access is selectively authorised includes a door shown at 2 closed and at 2' open. Opening of the door is enabled by an electrically operated striking box 4 which is responsive to a command signal from a device 3 for selectively authorising passage through the door, when a magnetic card carrying an encoded digital signal inserted in a slot 5 is recognised as acceptable by the device 3. Note that as shown in FIG. 1, the system is not substantially different to prior art systems. However, and as seen better in FIG. 2, the device 3 comprises two slots 5 and 5', one of each side of the wall 1, communicating via a card path 6, so that a card may be inserted into slot 5 at position 7 or into slot 5' at position 7', according to the side of the door from which the card bearer approaches. The recovery of the card from slot 5 or 5', as appropriate, will be described later.

Figure 3:
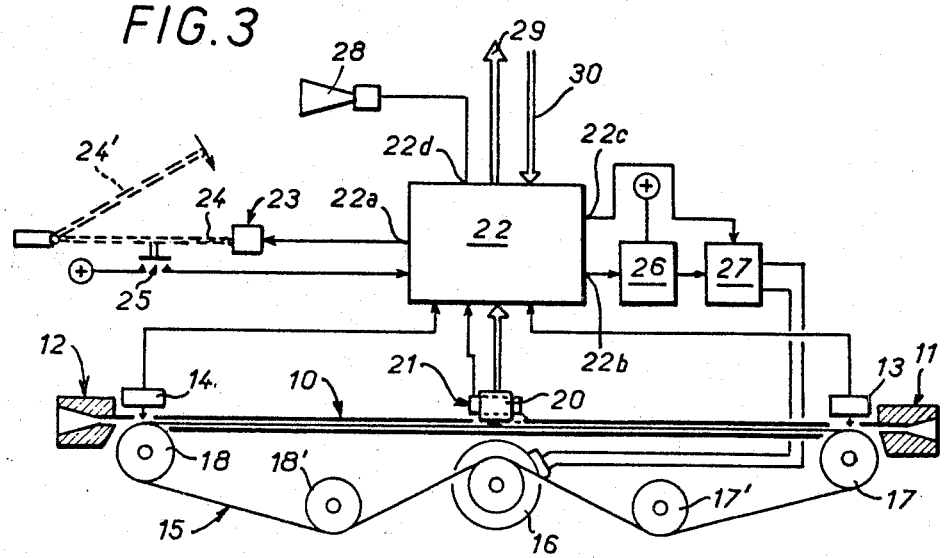
FIG. 3 is a schematic longitudinal cross-section through a device in accordance with the invention.

Referring to FIG. 3, the card reader comprises a longitudinal card path 10 terminating at its opposite ends in respective slots 11 and 12 with respective card sensors 13 and 14. The base of the card path 10 consists of an endless conveyor belt 15 passing around idler rollers 17 and 18 located beneath sensors 13 and 14 respectively, tensioning rollers 17' and 18' and a drive roller rotated by a reversible motor 16. It will be understood that a magnetic card inserted in slot 11 or 12 may be moved to the other slot by rotation of the motor 16 in the appropriate direction.

Centrally located longitudinally of the card path 10 are a magnetic read head 20 and a card sensor 21.

A microprocessor-based control logic unit 22 receives "card present" signals from sensors 13, 14 and 21, digital signals from read head 20 and a "door closed" signal from a switch 25 operated by the door 24. Logic unit 22 comprises output 22a sending a command signal to the electrically operated striking box 23, output 22b connected to a relay 26 controlling operation of motor 16, output 22c connected to an inverter 27 controlling the direction of rotation of motor 16 and output 22d to an audible warning device 28. An optional listing signal output 29 is connected to a central monitoring unit (not shown) and an optional signal input 30 receives signals from a central control unit.

OPERATION

The device operates as follows: a card with an encoded digital signal recorded on a magnetic stripe extending along its longitudinal median axis is inserted in slot 11 or 12 (hereinafter referred to as the first slot). The associated card sensor 13 or 14 responds by sending a signal to logic unit 22, which sets inverter 27 so that the motor drives belt 15 in the direction (hereinafter referred to as the first direction) appropriate to moving the card from the first slot (11 or 12, as appropriate) towards the second slot (12 or 11, as appropriate). This signal also energises relay 26, which starts the belt moving in the first direction. The card is moved beneath read head 20, which sends the read digital signal to logic unit 22. Sensor 21 simultaneously sends a "card present" signal to the microprocessor. If the microprocessor has recognised the entire recorded digital signal before the card moves away from sensor 21, it sends a signal to de-energise relay 26 and then proceeds to analyse the signal read from the card. On the other hand, if the card moves away from sensor 21 before the entire digital signal recorded on the card has been recognised by the microprocessor, as a result of a read error, relay 26 is de-energised, inverter 27 is reset so as to condition operation of the motor in a second direction and relay 26 is re-energised to return the card to the first slot. The relay is de-energised again when the sensor at the first slot detects the presence of the card. The card bearer may then take back and re-insert the card to attempt an error-free operation.

The analysis of the read signal is a matter for the system software and is outside the scope of the present invention. This analysis involves comparing the read signal with sets of signals stored in a read only and a random access memory associated with the microprocessor. A first set of signals authorise opening of the door. A second set of signals correspond to presumed serious misdemeanours (card stolen or lost, for example). A third set of signals is used to identify a program modification code. There are three possible outcomes:
the analysed signal does not correspond to the first set or the second set;
the signal corresponds to the first set;
the signal corresponds to the second set.

In the first of these three cases, analysis continues to check if the signal is in the third set or not. If yes, the program modification code (see below) is recorded in the random access memory. If no, analysis is halted. Thereafter, whether a program modification code has been recorded or not, a signal on output 22c actuates inverter 27 and relay 26 is energised to start the motor in the second direction. Detection of the card by the sensor associated with the first slot de-energises relay 26, to complete return of the card to the bearer. Except in the case of deliberate entry of a program modification code, return of the card to the bearer signifies that the bearer is not authorised to pass through the door.

In the second of the above three cases, microprocessor output 22a carries a command signal and door 24 opens to position 24'. A time-delay is simultaneously started, its duration corresponding to that required to pass through door 24 without undue haste. If door 24' is returned to the closed position 24 before the end of the time-delay, the time-delay is without effect. Otherwise a signal appears on output 22d to trigger audible warning device 28. This indicates that the door has been open for an excessively long period.

Closing the door closes switch 25, to energise relay 26. Motor 16 operates in the first direction. Arrival of the card at the second slot de-energises relay 26 and stops motor 16. The card bearer can thus recover the card which has "gone through" the door with him.

In an alternative arrangement, the alarm is sounded whenever switch 25 is open and the time-delay is not in progress. This means that unauthorised opening of the door is also signalled. The necessary circuits will be obvious to the person skilled in this art.

Finally, in the third of the above three cases, relay 26 is energised to restart the motor in the first direction. A time-delay is started, its duration being such that the card is passed through the second slot before relay 26 is de-energised. A hopper may be provided beneath the slot to recover the card. Misappropriated cards are thus withdrawn from circulation.

Figure 4:
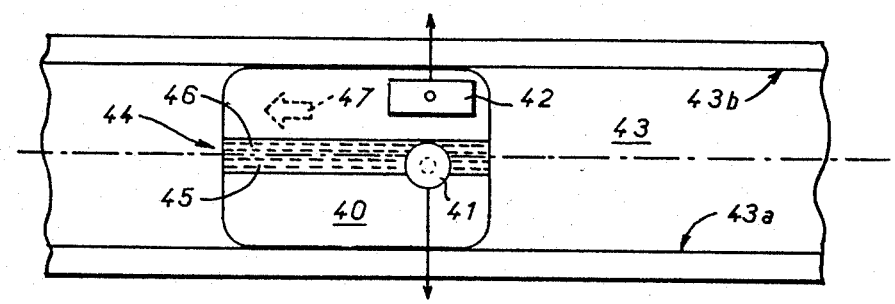
FIG. 4 is a plan view of the card path.

Referring to FIG. 4, the generally rectangular card 40 is guided along the path 43 by side walls 43a and 43b. Along its longitudinal median axis the card carries a stripe 44 of magnetisable material, divided into two tracks 45 and 46 which are symmetrical relative to the longitudinal median axis of the card. Read head 41 is offset to one side of the longitudinal axis of the path 43, such that track 45 or track 46 is under head 41, according to the direction of insertion of the card, the card being presented to the slot in the orientation indicated by an arrow 47 printed on the card. Alongside head 41 is card sensor 42. It will be understood that the digital signals recorded on tracks 45 and 46 may differ in certain respects, such that the conditions authorising opening of the door may be different for the two directions of approach to the door. For example, the times at which access is selectively authorised may differ from the times at which exit is selectively authorised.

Referring to FIG. 5, a buffer memory is interconnected between the read head and the microprocessor. The digital signal on the card is subdivided into a predetermined number of words, each comprising a predetermined number of binary digits, eight for example (bytes). Buffer memory 50 has as many word locations as there are words in the digital signal on the card. An address counter 51 has a capacity equal to the number of word locations in buffer memory 50. It has an increment input 51a, a decrement input 51b and an overflow output 51c. Its addressing outputs are connected to the corresponding locations of buffer memory 50. Buffer memory 50 is connected to the output of an AND gate 54 by a bus 50a. The word signal input 54a of this gate is connected to the read head. Bus 50a is also connected to the word signal input of an AND gate 55, the output 55a of which is connected to the microprocessor. Increment input 51a and decrement input 51b are connected to the outputs of respective AND gates 52 and 53, which both receive on a first input pulses from a clock 56. Their second inputs are connected to write command input 57 and read command input 58, respectively, these inputs being also connected to the second inputs of gates 54 and 55, respectively.

Clock 56 is a counter which divides down by the number of binary digits in a word. Timing signals on its input 56a are conditioned either by the recognition of successive binary digits of the digital signal recorded on the card by the read head, or by the clock internal to the microprocessor.

When a card arrives in the vicinity of the read head and the associated sensor (21 in FIG. 3, 42 in FIG. 4), logic "1" is applied to write input 57, opening AND gate 54 to connect bus 50a to the read head and opening AND gate 52 to feed clock pulses from clock 56 to the increment input 51a of address counter 51. Each time a complete word is read, counter 1 is incremented by unity, so that each successive word of the digital signal is written into the location reserved for it in memory 50. When all words have been read and written to memory, a signal appears on overflow output 51c, to indicate that the write operation has proceeded correctly. As has already been explained, writing must be terminated correctly for analysis to be possible. If the read head has not scanned the full number of binary digits which should be contained in the digital signal, no overflow signal appears on output 51c and the card is returned to the first slot without the analysis being carried out. In this case counter 51 is reset to zero.

To send the recorded digital signal one word at a time to the microprocessor, logic "1" is applied to input 58 to open AND gate 55 to connect bus 50a to the microprocessor data input, connected to output 55a of gate 55. AND gate 53 is also opened to connect clock 56 to decrement input 51b of address counter 51. As words are acquired by the microprocessor, counter 51 is decremented so that the words of the digital signal are acquired successively in the reverse order to that in which they are read from the card. In this way, if a read error occurred on any digit of the digital signal, affecting all words read subsequently, this error will be present in the first word acquired by the microprocessor. Analysis will therefore detect on the very first word that the signal recorded in the buffer memory is not in any of the three sets corresponding to an authorisation, presumed fraudulent use and a program modification code, respectively. The card will thus be returned to the first slot without any mis-operation being commanded by the device.

It will be understood that the wired logic buffer just described may be replaced by a program run by the microprocessor whereby the digital signals are read into random access memory and subsequently extracted therefrom for analysis.

The microprocessor may be of the MOS 6502 type, for example, and is associated with a read only memory and a random access memory. The read only memory may be programmable (PROM) or reprogrammable (REPROM). It stores the program and a plurality of basic digital signals, corresponding to standing general instructions controlling access authorisation and program modifications. The random access memory stores digital signals, in particular the special words of a digital signal on a program modification code card. These special words cause the program to switch between alternative routines, such that subsequent insertion of a standard card results in the words on that card being written into the random access memory to modify the set of authorising signals or the set of "presumed fraud" signals, for example.

The microprocessor may be associated with a clock system generating time and date signals for defining times of day and days on which access authorisations are enabled or not. It is thus possible, without direct intervention at the device, to authorise selective access to an area at certain times of day only, or on certain days only, for specified persons. Modifications according to the time of day or date are effected by inserting the appropriate program modification code card and then inserting a card carrying clock signals corresponding to the required authorisation periods.

As shown in FIG. 3, the microprocessor may comprise a data input 30 connected to a central control unit. This input might be used to input to the microprocessor digital signals similar to the encoded signals on the cards, or to record in the random access memory program modification codes to modify the authorisation and presumed fraud signal sets, or to open all or selected doors fitted with the device, in the event of a fire, for example.

Listing signal output 29 carries digital signals representing certain program steps, corresponding to main program instructions and data recognised on the step in question. Output 29 may be connected to a suitably programmed central computer system for clear language display of device operation, for monitoring operation as with a conventional computer printout. Note that this listing facility is independent of device operation, the device operating at all times on a stand-alone basis.

For installations with a small number of devices, where the overheads of computer monitoring are not justified, a cassette recorder may be connected to output 29 in each device. The cassettes may be played back at the end of the day, for example, for off-line monitoring of device operation. Note also that the recorded signals may be used for timekeeping purposes, in conjunction with the time of day and date signals.

FIG. 6 is a flowchart of the basic program controlling the operation of the device. The program starts at step 100, in response to a "card present" signal from sensor 13 or 14 associated with slot 11 or 12, respectively. This signal also records the slot associated with the activated sensor as the first slot A. Step 101 sets inverter 27 (FIG. 3) for movement from first slot A to second slot B. Step 102 energises relay 26 (FIG. 3) to start the motor (MT:1). Step 103 is conditional and loops the program until the card is detected by sensor C associated with the read head (sensor 21 in FIG. 3). On activation of sensor C the program steps to step 104, to connect read head L to buffer memory TP to record a group of digits, normally one word. The program then advances to conditional step 105. If the buffer is not full the program advances to conditional step 106, which verifies that sensor C is still activated. If so, the program returns to step 104 to acquire the next word and the program loops on steps 104, 105, 106 until the buffer is full (refer to description relative to FIG. 5). At this time the program advances from step 105 to step 107. If sensor C is de-activated before the buffer is full (read error), the program advances from step 106 to step 130.

At step 107 relay 26 (FIG. 3) is de-energised (MT:0). The program advances to conditional step 108, at which the microprocessor analyses the recorded signal to determine if the access authorising conditions are fulfilled. If yes, the program advances to step 109, to enable the sensor at the second slot B, and then to step 110, at which an electrical command signal is sent to the electrically operated striking box (23 in FIG. 3) to enable the door to be opened. On step 111 time-delay T1 (maximum door open duration) is started (T1:1). The program then goes to conditional step 112 to verify if the time-delay T1 has expired (T1:?). If not, the program advances to step 114, at which the state of the "door closed" switch FR (25 in FIG. 3) is recorded. The program then advances to conditional step 115 to verify if switch FER is in the "door closed" position (FER?). If no, the program returns to step 112 and the program loops on steps 112, 114, 115. If time-delay T1 expires prior to the appearance of signal FER, the program advances from step 112 to step 113 to energise the audible warning device 28 (FIG. 3), then to step 114, then to step 115. The program then loops on steps 112-113. Whether the alarm is sounded or not, the appearance of signal FER on step 114 advances the program from step 115 to step 116, at which the motor control relay is energised, and then to step 117 at which a "card present" signal for slot B advances the program to step 129, on which the motor control relay is de-energised. The program then returns to the waiting condition on step 100. When the motor stops following execution of program step 117, the card is present at second slot B and may be recovered by the bearer.

If the authorising signal is not recognised on step 108, the program advances to conditional step 118 to verify the "presumed fraud" signal (LN?). If the result is positive (signal recorded on card is in the random access memory "blacklist"), the program advances to step 119 to energise the motor control relay, to step 120 to generate a fraud or blacklist alarm signal ALN, to step 121 to start time-delay T2 (T2:1) sufficient to feed the card to second slot B and to conditional step 122 on which the program loops until time-delay T2 expires, at which time the program advances to step 129 to de-energise the motor control relay (end of program). Note that in this case (presumed fraudulent use of the card), the bearer, who remains on the slot A side of the wall, is deprived of the card, which is ejected from slot B on the other side of the wall, dropping into a container provided for this purpose. The fraud alarm signal ALN also alerts security personnel.

If the tests on steps 108 and 118 are negative, the program advances from step 118 to conditional step 123 to analyse the signal to see if it is a program modification code. If no, the program advances to step 125. If yes, the program advances to step 124 to command the acquisition by random access memory MV of the program modification code words recorded in the buffer. It then advances to step 125 to operate inverter INV (27 in FIG. 3) to move the card in the direction from second slot B to first slot A, and then to step 126 on which the sensor associated with first slot A is enabled, to step 127 on which the motor control relay is energised, to step 128 on which the program waits for activation of the sensor at first slot A, and finally to step 129 to de-energise the motor control relay on feeding the card to first slot A, to be recovered by the bearer.

If incorrect loading of the buffer is detected in loop 104, 105, 106, the program advances from step 106 to step 130 to de-energise the motor control relay and then to step 125, to return the card as previously described (steps 126, 127, 128 and 129).

In the foregoing description, structural elements of the device, the arrangement and interconnection of the peripheral units and the programming of the microprocessor, insofar as these are within the scope of the present invention, are described in relation to software aspects which are of themselves outside the scope of the invention. Nevertheless, an outline description of these software aspects is indispensible to a full description of the co-operation of the structural elements whereby the present invention constitutes a solution to the stated problem. Furthermore, all the description relating to the analysis of the digital signals is concerned purely with software, and has been given in general functional terms sufficient to enable a person skilled in the art to write a program for implementing the structural elements appropriate to the stated objectives of the invention.

No mention has been made in the description of any specific type of card sensor or electrically operated striking box, as it will be evident to the person skilled in the art that the selection of suitable units from the wide range available on the market is a matter of routine design. By way of example, the card sensors may be electromechanical microswitches or photo-electric sensors comprising a light-emitting diode and a photo transistor or magnetic sensors detecting magnetised areas on the card. The term "electrically operated striking box" as used in this description should be understood as covering such alternatives as bolt-release mechanisms, servomotors operating the door and solenoid valves controlling pneumatic actuators.

The foregoing description refers throughout to single doors. The invention is applicable to existing buildings, without replacement of existing doors. Without departing from the scope of the invention, the term "door" may also be understood as encompassing a double door arrangement (airlock) where access is through two successive doors operating in conjunction with the intention of reducing the risk of a number of persons passing through the "door" using a single card. The card path would then extend across the full depth of the airlock arrangement, with one slot on each side. The command signal would open or enable opening of the door encountered first on approaching the airlock. The card bearer would close this first door on entering the airlock, which would open or enable opening of the second door. Closing the second door would feed the card to the second slot, beyond the airlock, for recovery by the bearer. The doors (and slots) would be classified as "first" and "second" according to the slot used to insert the card, as already explained. The person skilled in the art will have no difficulty in following through the foregoing description and defining the sequence of operations to be carried out, the necessary control and monitoring systems and the associated program.

The detailed description above refers to magnetic cards, similar to those in common use for controlling selective operations such as the opening of doors and gates. It will be apparent that the cards could carry digitally encoded stripes to be read by any suitable method (optical, ferro-electrical, etc), without departing from the scope of the invention.

The stand-alone operation of the device in accordance with the invention evidently makes it suited to operation with a conventional standby power supply system, for continued operation following deliberate or accidental failure of the local mains power supply.

The reader will have understood that the invention is particularly suited to application in industrial, commercial and scientific establishments, where secret and confidential work is carried on and the risk of disclosure requires that access to certain areas be reserved to duly authorised personnel, possibly for predetermined periods. The device's stand-alone operation capability and the resulting flexibility of use also make it suited to application in establishments of relatively small size.

We claim:

1. A device for selectively authorizing the bearer of a coded card to pass through a door in a wall, the device comprising: a card reader located in the vicinity of the door and accessible from the or each approach side thereof, said card reader being responsive to the insertion of a card by reading a digital signal recorded on the card and comprising a path along which the card is moved, extending longitudinally between opposite sides of the aforementioned wall and terminating at its opposite ends in respective slots with respective card sensors, a bidirectional drive system for moving a card in either of two opposite directions along said path and a read head centrally located on said card path to read the aforementioned signal from a longitudinal track centrally located on the card; means for opening or permitting opening of the door in response to an electrical command signal; a logic unit including a memory and connected to said card reader and said door opening means to compare the read digital signal with a plurality of digital signals stored in said memory and responsive to equality of said read signal with at least one of said stored signals by sending an electrical command signal to said door opening means, said logic unit being responsive to insertion of a card in the first of said slots by causing said drive system to operate in such a way as to move the card in a first direction from said slot to a position beyond said read head and selectively responsive to comparison of the signal read from the card with the aforementioned plurality of signals by causing said drive system to operate in such a way as to move the card in a second direction opposite to said first direction so as to return it to the first slot, or by sending an electrical command signal to said door opening means; and means responsive to closure of the door following the sending of said electrical command signal to said door opening means by causing said drive system to operate in such a way as to move the card to the second slot.

2. A device according to claim 1, wherein the selective response of said logic unit to comparison of the signal read from the card with the aforementioned plurality of signals comprises the further option of causing said drive system to operate in such a way as to move the card to the second slot, without forwarding said electrical command signal to said door opening means.

3. A device according to claim 1 or claim 2, wherein said read head is offset to one side of a central longitudinal axis of said card path so as to read one of two tracks on said card, according to which of the slots is used to insert the card in the reader.

4. A device according to claim 1 or claim 2 or claim 3, further comprising a system responsive to opening of the door by initiating a predetermined time-delay and responsive to non-closure of the door by triggering an alarm signal at the end of said pre-determined time-delay.

5. A device according to any one of claims 1 to 3, wherein said logic unit comprises a microprocessor, respective read only memories constituting a program store and a store for said plurality of digital signals, and a random access memory for recording digital signals from said read head.

6. A device according to claim 5, wherein said logic unit comprises a buffer memory with sequentially written locations for storing successive words, each word comprising a predefined subset of the digital signals recorded on a card, and means for reading the content of the buffer memory sequentially in the direction opposite to the write direction.

7. A device according to claim 5, wherein said logic unit comprises a clock system providing time and date signals, whereby the selective authorisation to pass through the door may be conditioned by the time of day and date.

8. A device according to claim 5, wherein the logic unit has a monitor output whereby signals are output for listing purposes.

9. A device according to claim 5, wherein said logic unit has a digital signal input for writing signals into the random access memory.

10. A device according to claim 4, comprising a further alarm system which is disabled by said means responsive to closure of the door and which is also disabled by said time-delay system between the start and end of said time-delay, whereby an alarm is given if the door is open with the time-delay inoperative.

* * * * *